US008600121B2

(12) United States Patent  (10) Patent No.: US 8,600,121 B2
Gamliel et al.  (45) Date of Patent: Dec. 3, 2013

(54) FACE RECOGNITION SYSTEM AND METHOD

(75) Inventors: Avihu Meir Gamliel, Pardes-Hana (IL); Shmuel Goldenberg, Ness-Ziona (IL); Felix Tsipis, Ma'alei Adomim (IL); Yuri Kheifetz, Tel-Aviv (IL); Ester Freitsis, Ashdod (IL)

(73) Assignee: C-True Ltd., Rehovot (IL)

( * ) Notice: Subject to any disclaimer, the term of this patent is extended or adjusted under 35 U.S.C. 154(b) by 209 days.

(21) Appl. No.: 12/919,076

(22) PCT Filed: Jun. 24, 2009

(86) PCT No.: PCT/IB2009/052720
§ 371 (c)(1),
(2), (4) Date: Aug. 24, 2010

(87) PCT Pub. No.: WO2010/001310
PCT Pub. Date: Jan. 7, 2010

(65) Prior Publication Data
US 2011/0091080 A1  Apr. 21, 2011

Related U.S. Application Data

(60) Provisional application No. 61/133,711, filed on Jul. 2, 2008.

(51) Int. Cl.
*G06K 9/00* (2006.01)
(52) U.S. Cl.
USPC ......................................................... 382/118

(58) Field of Classification Search
USPC .................................................. 382/115, 118
See application file for complete search history.

(56) References Cited

U.S. PATENT DOCUMENTS

| | | | |
|---|---|---|---|
| 5,164,992 A | 11/1992 | Turk et al. | |
| 5,625,704 A * | 4/1997 | Prasad | 382/118 |
| 5,859,921 A * | 1/1999 | Suzuki | 382/118 |
| 6,633,655 B1 * | 10/2003 | Hong et al. | 382/118 |
| 7,050,608 B2 | 5/2006 | Dobashi | |
| 7,221,780 B1 | 5/2007 | Wang | |
| 7,221,809 B2 | 5/2007 | Geng | |
| 7,426,287 B2 * | 9/2008 | Yoon et al. | 382/118 |
| 7,436,988 B2 * | 10/2008 | Zhang et al. | 382/118 |
| 7,515,773 B2 * | 4/2009 | Adachi et al. | 382/291 |
| 7,620,217 B2 | 11/2009 | Chen et al. | |
| 7,860,280 B2 * | 12/2010 | Danowitz | 382/118 |
| 8,184,853 B2 * | 5/2012 | Pilu et al. | 382/103 |

(Continued)

OTHER PUBLICATIONS

Hadid, A.; Pietikainen, M.; Martinkauppi, B.; , "Color-based face detection using skin locus model and hierarchical filtering," Pattern Recognition, 2002. Proceedings. 16th International Conference on , vol. 4, no., pp. 196-200 vol. 4, 2002.*

(Continued)

*Primary Examiner* — Utpal Shah
(74) *Attorney, Agent, or Firm* — The Law Office of Michael E. Kondoudis

(57) ABSTRACT

Apparatus for face recognition, the apparatus comprising: a face symmetry verifier, configured to verify symmetry of a face in at least one image, according to a predefined symmetry criterion, and a face identifier, associated with the face symmetry verifier, and configured to identify the face, provided the symmetry of the face is successfully verified.

24 Claims, 14 Drawing Sheets

(56) References Cited

U.S. PATENT DOCUMENTS

| | | |
|---|---|---|
| 8,265,349 B2 * | 9/2012 | Wang et al. .................... 382/118 |
| 8,265,351 B2 * | 9/2012 | Aarabi ........................... 382/118 |
| 2004/0062424 A1 * | 4/2004 | Mariani et al. ................ 382/118 |
| 2004/0117638 A1 | 6/2004 | Monroe |
| 2004/0227856 A1 * | 11/2004 | Cooper .......................... 348/512 |
| 2005/0018925 A1 | 1/2005 | Bhagavatula et al. |
| 2005/0063568 A1 * | 3/2005 | Sun et al. ....................... 382/117 |
| 2006/0078172 A1 * | 4/2006 | Zhang et al. ................... 382/118 |
| 2007/0183663 A1 * | 8/2007 | Wang et al. .................... 382/173 |
| 2008/0002866 A1 | 1/2008 | Fujiwara |
| 2008/0037838 A1 | 2/2008 | Ianculescu |
| 2008/0240516 A1 * | 10/2008 | Hayaishi et al. .............. 382/118 |

OTHER PUBLICATIONS

Robert Mariani "A face location and recognition system based on tangent distance" Published in Book: Multimodal interface for human-machine communication, pp. 3-31, 2002.*

International Search Report and Written Opinion dated Dec. 4, 2009 in corresponding international application No. PCT/IB09/52720.

International Preliminary Report on Patentability dated Jan. 5, 2011 in corresponding international application No. PCT/IB09/52720.

* cited by examiner

FACE RECOGNITION SYSTEM AND METHOD

FIELD AND BACKGROUND OF THE INVENTION

The present invention relates to face authentication and recognition and, more particularly, but not exclusively to a system and method for automatic face authentication and recognition, say for security and surveillance purposes.

Currently, two popular applications of face recognition systems are access control and security screening.

Access control systems are used to authenticate the identity of individuals before allowing entry into a secure area. Specifically, the system stores images of personnel authorized to enter the secure area. When entry is attempted, the person's facial image is captured, and compared to facial images of authorized personnel. When a facial image match is detected, entry is granted.

For example, U.S. Pat. No. 7,050,608, to Dobashi, filed on Mar. 7, 2002, entitled "Face image recognition apparatus", discloses a face image recognition apparatus.

Dobashi's face image recognition apparatus includes a registration information holding section in which a reference feature amount of the face of at least one to-be-recognized person is previously registered. The feature amount of the face is extracted from a face image input via an image input section, by use of a feature amount extracting section.

A recognition section determines the recognition rate between the extracted feature amount and the reference feature amount registered in the registration information holding section. A feature amount adding section additionally registers the feature amount extracted by the feature amount extracting section as a new reference feature amount into the registration information holding section when it is determined that the determined recognition rate is lower than a preset value.

U.S. Pat. No. 7,221,809, to Geng, filed on Dec. 17, 2002, entitled "Face recognition system and method", discloses a method of automatically recognizing a human face.

The method described by Geng includes developing a three-dimensional model of a face, and generating a number of two-dimensional images based on the three-dimensional model. The generated two-dimensional images are then enrolled in a database and searched against an input image for identifying the face of the input image.

Security screening involves capturing images of people in public places and comparing them to images of persons who are known to pose security risks. One primary example of security screening is its use at airport security checkpoints.

For example, U.S. Pat. No. 5,164,992, to Turk, filed on Nov. 1, 1990, entitled "Face Recognition System", describes a recognition system for identifying members of an audience.

The system described by Turk includes an imaging system which generates an image of the audience and a selector module for selecting a portion of the generated image. Turk's system further includes a detection means which analyzes the selected image portion to determine whether an image of a person is present, and a recognition module responsive to the detection means for determining whether a detected image of a person identified by the detection means resembles one of a reference set of images of individuals.

U.S. patent application Ser. No. 10/719,792, to Monroe, filed on Nov. 21, 2003, entitled "Method for incorporating facial recognition technology in a multimedia surveillance system", discloses facial recognition technology integrated into a multimedia surveillance system for enhancing the collection, distribution and management of recognition data, by utilizing the system's cameras, databases, monitor stations, and notification systems.

With the system described by Monroe, at least one camera, ideally an IP camera is provided. This IP camera performs additional processing steps to captured video. Specifically, the captured video is digitized and compressed into a convenient compressed file format, and then sent to a network protocol stack for subsequent conveyance over a local or wide area network. The compressed digital video is transported via Local Area Network (LAN) or Wide Area Network (WAN) to a processor which performs steps of Facial Separation, Facial Signature Generation, and Facial Database Lookup.

U.S. patent application Ser. No. 11/450,581, to Chen et al., filed on Jun. 12, 2006, entitled "Three-dimensional face recognition system and method", describes a three dimensional (3D) face recognition system.

Chen's system has a first data storing module for storing three dimensional (3D) face model data and two dimensional (2D) face image data, an input unit for inputting 3D face model data and 2D face image data, a signal conversion module for converting analog data of the 3D face model data and 2D face image data to digital data, and a second data storing module for storing the digital data.

Chen's system further includes a micro-processing module for analyzing geometric characteristics of points in the 3D face model data stored in the first and second data storing module to determine feature points of the 3D face model data, and assigning different weight ratios to feature points.

Chen's system further includes a comparison module for comparing the feature points stored in the first and second data storing module. The different geometric characteristics are given different weight ratios, and the comparison module calculates relativity between the feature points to obtain a comparison result.

SUMMARY OF THE INVENTION

According to one aspect of the present invention there is provided an apparatus for face recognition. The apparatus comprises a face symmetry verifier, configured to verify symmetry of a face in at least one image, according to a predefined symmetry criterion, and a face identifier, associated with the face symmetry verifier, and configured to identify the face, provided the symmetry of the face is successfully verified.

According to a second aspect of the present invention there is provided an apparatus for face recognition. The apparatus comprises a face symmetry verifier, configured to verify symmetry of a face in at least one first image of the face, according to a predefined symmetry criterion, wherein the first image is associated with respective data identifying the face, and a face database updater, associated with the face symmetry verifier, and configured to update a face database with the first image of the face and the associated data identifying the face, provided the symmetry of the face in the first image is successfully verified.

According to a third aspect of the present invention there is provided, an apparatus for face recognition, the apparatus comprising: a face symmetry verifier, configured to verify symmetry of a face in at least one image, according to a predefined symmetry criterion, and a forwarding controller, associated with the face symmetry verifier, and configured to control forwarding of the image, according to a result of the verification of the symmetry by the face symmetry verifier.

According to a fourth aspect of the present invention there is provided a method for face recognition. The method comprises: a) verifying symmetry of a face in at least one image, according to a predefined symmetry criterion, and b) identifying the face, provided the symmetry of the face is successfully verified.

According to a fifth aspect of the present invention there is provided a method for face recognition, the method comprising: a) verifying symmetry of a face in at least one first image of the face, according to a predefined symmetry criterion, wherein the first image is associated with respective data identifying the face, and b) updating a face database with the first image of the face and the associated data identifying the face, provided the symmetry of the face in the first image is successfully verified.

According to a sixth aspect of the present invention there is provided a method for face recognition, the method comprising: a) verifying symmetry of a face in at least one image, according to a predefined symmetry criterion, and b) controlling forwarding of the image, according to a result of the verifying of the symmetry.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

Figure 1:
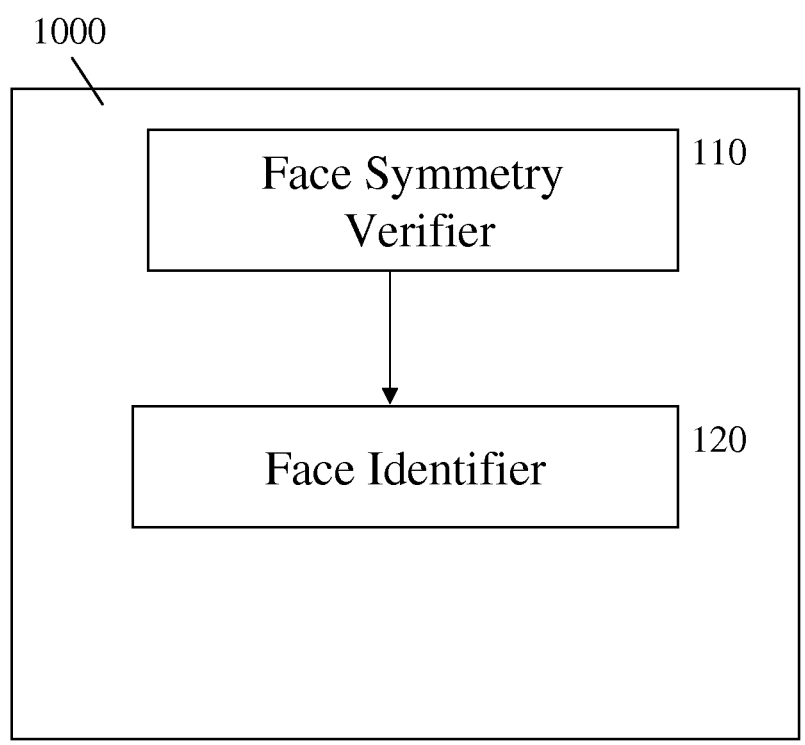

The description taken with the drawings making apparent to those skilled in the art how the several forms of the invention may be embodied in practice.

In the drawings:

FIG. 1 is a block diagram illustrating a first apparatus for face recognition, according to an exemplary embodiment of the present invention.

Figure 2:
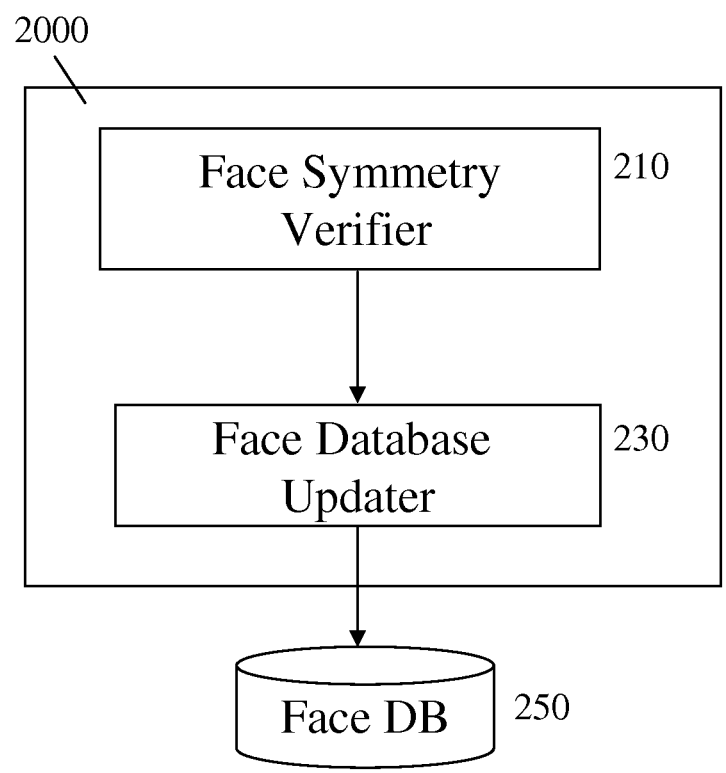

FIG. 2 is a block diagram illustrating a second apparatus for face recognition, according to an exemplary embodiment of the present invention.

Figure 3:
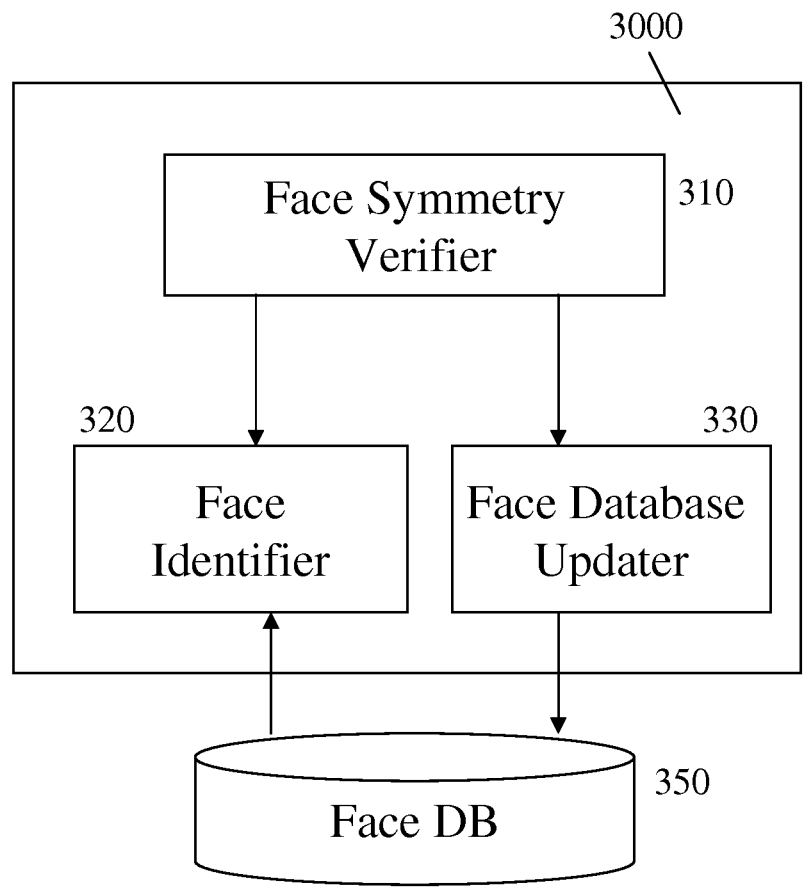

FIG. 3 is a block diagram illustrating a third apparatus for face recognition, according to an exemplary embodiment of the present invention.

Figure 4:
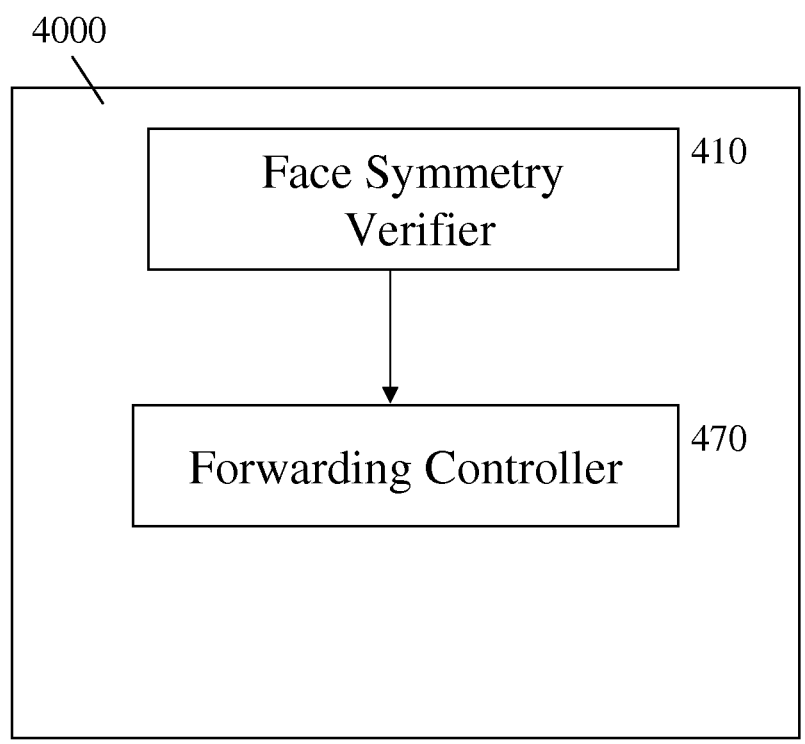

FIG. 4 is a block diagram illustrating a fourth apparatus for face recognition, according to an exemplary embodiment of the present invention.

Figure 5:
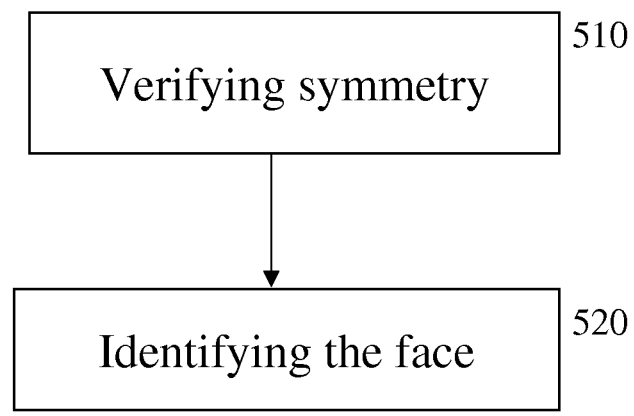

FIG. 5 is a flowchart illustrating a first method for face recognition, according to an exemplary embodiment of the present invention.

Figure 6:
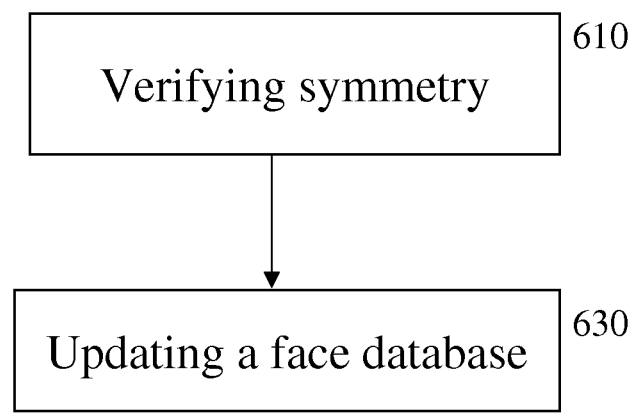

FIG. 6 is a flowchart illustrating a second method for face recognition, according to an exemplary embodiment of the present invention.

Figure 7:
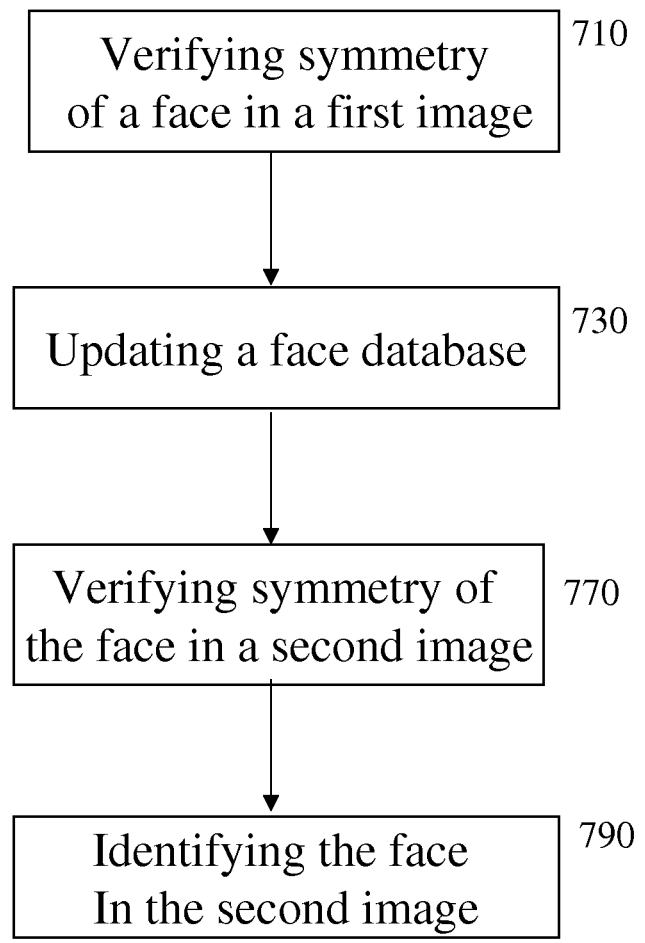

FIG. 7 is a flowchart illustrating a third method for face recognition, according to an exemplary embodiment of the present invention.

Figure 8:
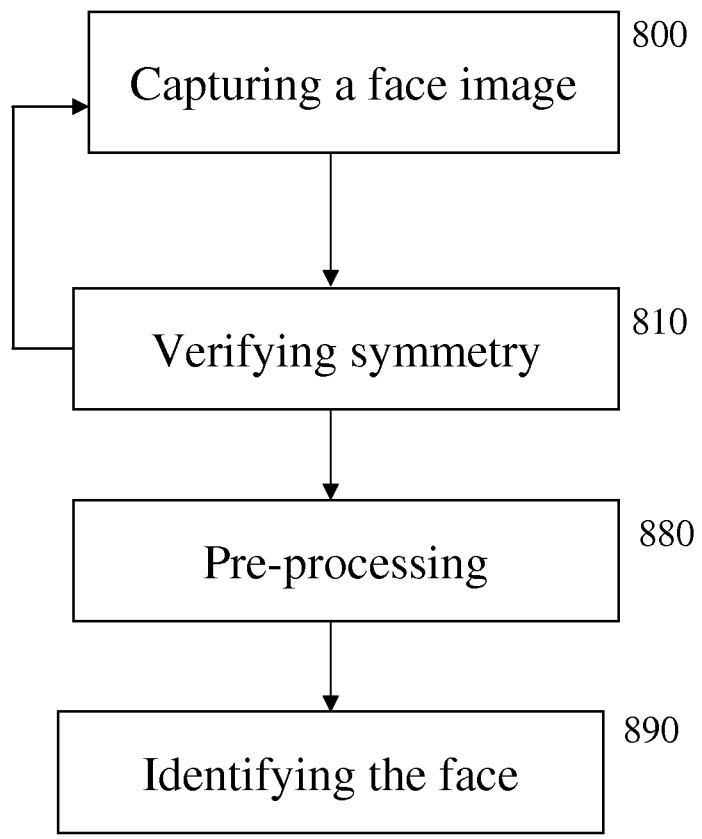

FIG. 8 is a flowchart illustrating a fourth method for face recognition, according to an exemplary embodiment of the present invention.

Figure 9:
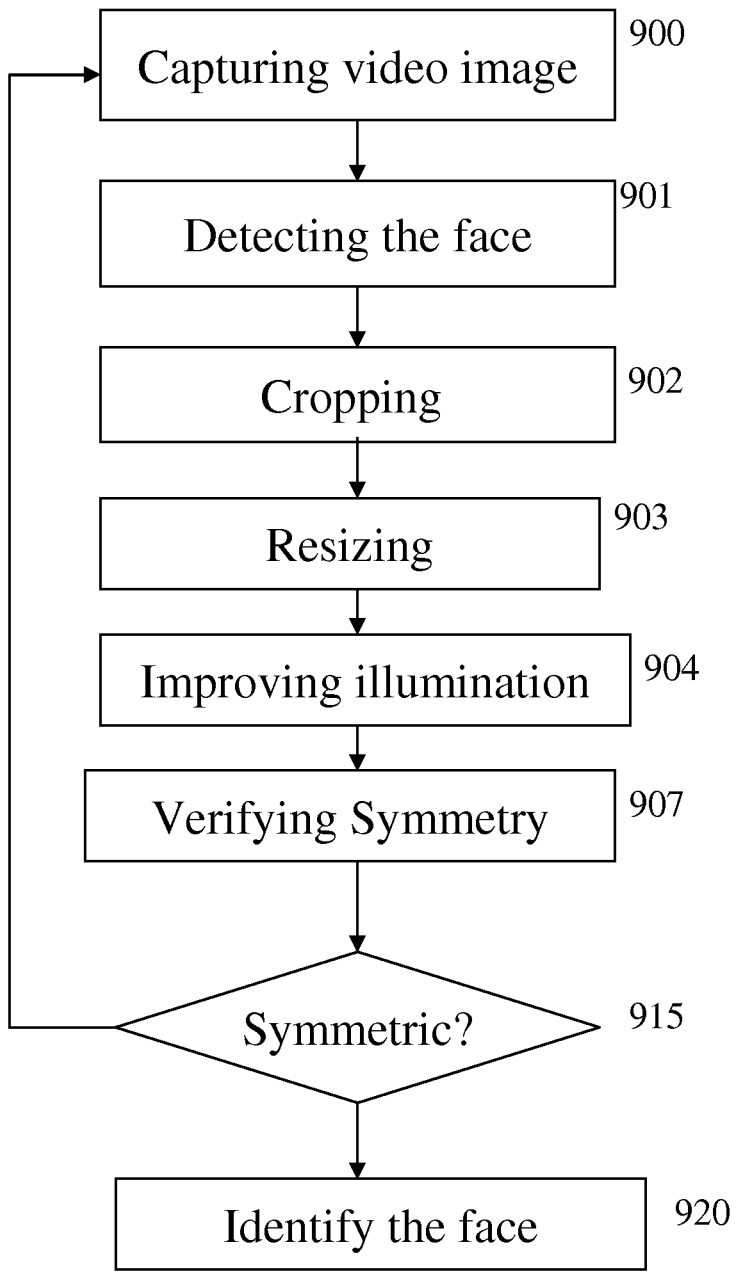

FIG. 9 is a flowchart illustrating a fifth method for face recognition, according to an exemplary embodiment of the present invention.

Figure 10:
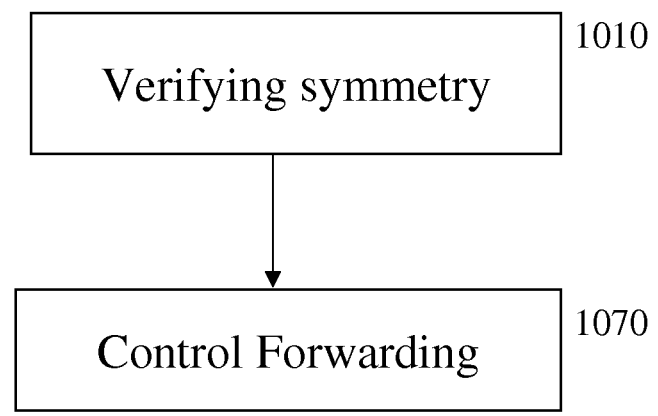

FIG. 10 is a flowchart illustrating a sixth method for face recognition, according to an exemplary embodiment of the present invention.

Figure 11:
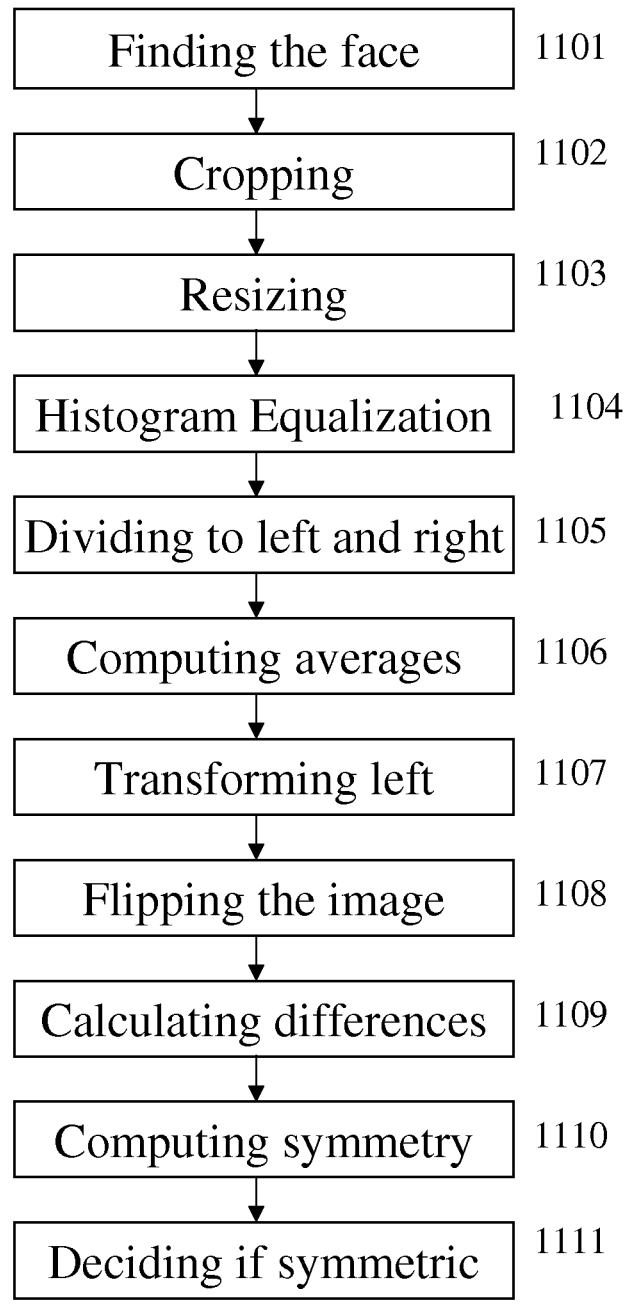

FIG. 11 is a flowchart illustrating a seventh method for face recognition, according to an exemplary embodiment of the present invention.

Figure 12:
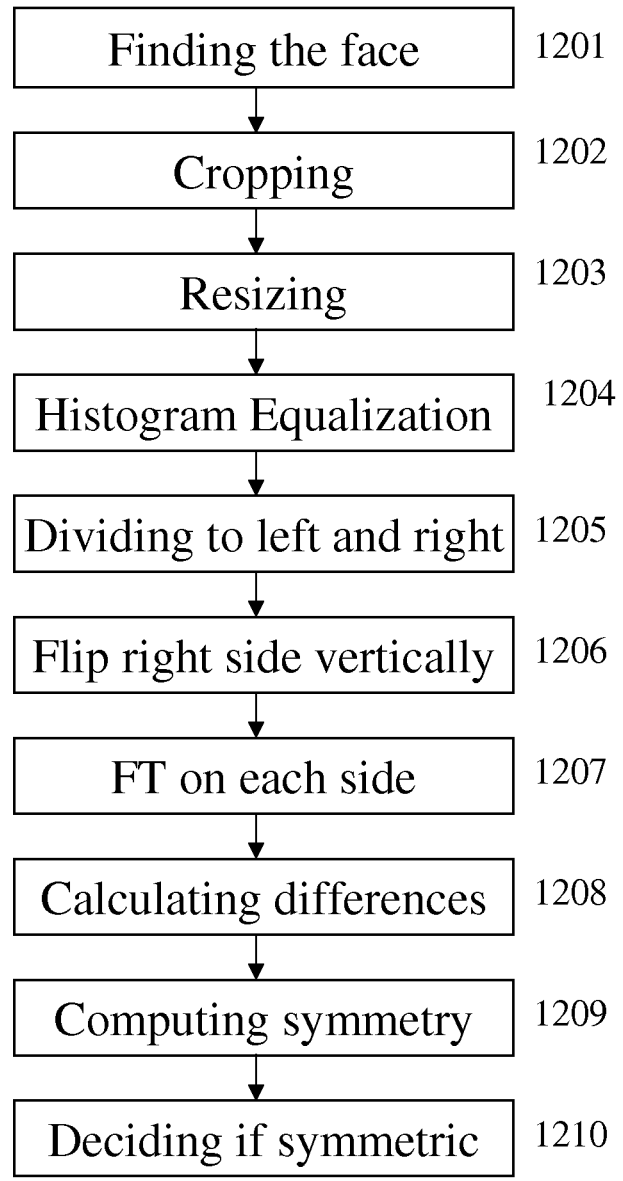

FIG. 12 is a flowchart illustrating an eighth method for face recognition, according to an exemplary embodiment of the present invention.

Figure 13:
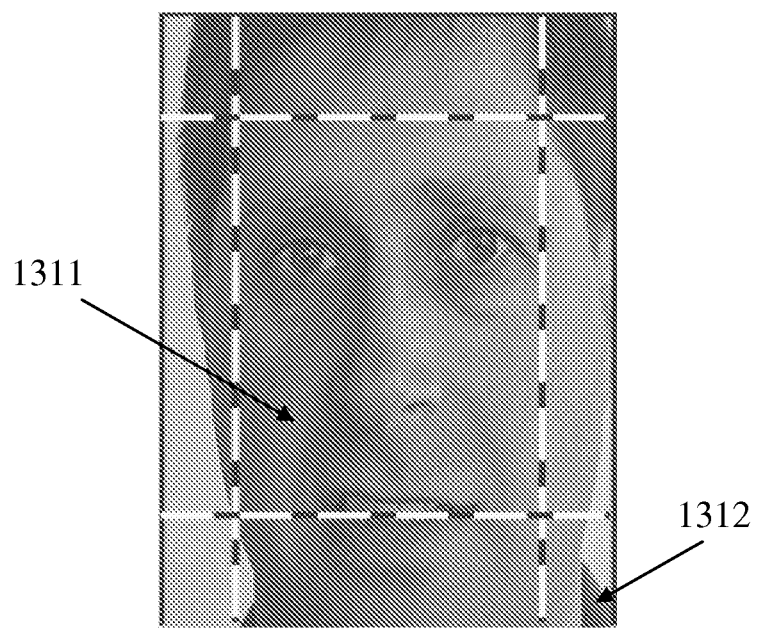

FIG. 13 illustrates cropping of an image of a face, according to an exemplary embodiment of the present invention.

Figure 14A:
Figure 14B:
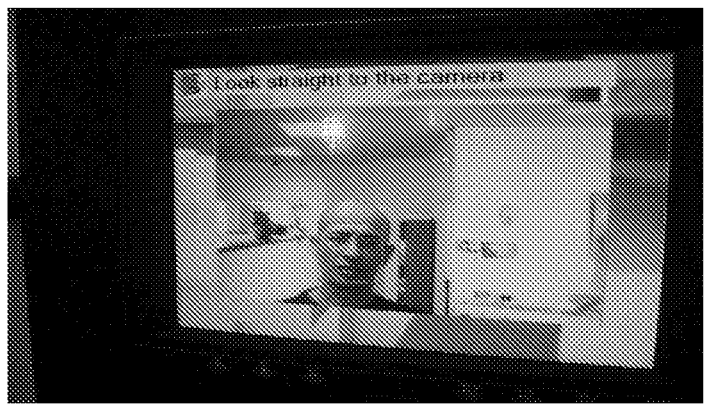
Figure 14C:
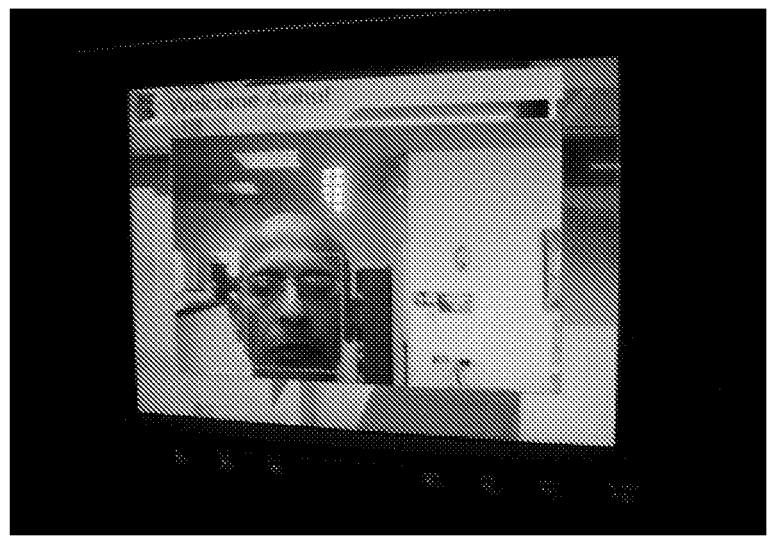

FIGS. 14a, 14b, and 14c illustrate a face recognition scenario, according to an exemplary embodiment of the present invention.

DESCRIPTION OF THE PREFERRED EMBODIMENTS

The present embodiments comprise an apparatus and method for recognizing a face in one or more images (say a still image, a sequence of video images, etc.).

According to an exemplary embodiment of the present invention, a database of faces which belong to known individuals (say to criminals, or to authorized users of a classified information system) is used to store images of the faces of the known individuals.

Optionally, the database of faces rather stores one or more features extracted from each of the faces, say a biometric stamp extracted from the image of each of the faces, using conventional biometric methods, as known in the art.

Preferably, a face as captured in the image has to comply with a symmetry criterion defined in advance, before the image (bearing the face) is forwarded for storage in the face database, as described in further detail hereinbelow.

Optionally, the symmetry criterion pertains to a statistical model run over previously received images.

For example, the symmetry criterion may be based on a degree of deviation of the image (and thus the face captured in the image) from an average image, as known in the art. The average image is calculated from the previously received images, using known in the art methods. In the average image, each pixel's intensity equals an average of intensities of pixels in the same position in the previously received images. The average image is likely to be symmetric. Consequently, a comparison made between the average image and a captured image is indicative of the degree of symmetry of the captured image.

Optionally, the symmetry criterion is based on a comparison made between the image bearing the face and one or more images previously captured from the same user. That is to say that the face of the user in the image is compared with the face of the same user, as captured in previously received image(s), or with an average image calculated from previously received images of the same user. The average image thus bears an average of the face, as described in further detail hereinabove.

Optionally, the symmetry criterion is based on symmetry of a polygon, which connects selected parts of the captured image.

Optionally, the selected parts are known elements of a human face (say nose, eyes, or mouth). The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image.

For example, the centers of the right eye, left eye, and nose, in the captured image, may be connected to form a triangle, which is expected to be isosceles, and thus symmetric. A successful verification of the triangle as isosceles (say by a comparison made between the triangle's arms) indicates that the face captured in the image is indeed symmetric.

Similarly, the centers of the eyes and edges of lips in the image bearing the face may be connected to form a trapezoid, which is also expected to be symmetric, etc.

Optionally, the selected parts are segments of the face in the image. The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as known in the art.

The mass centers of the selected segments (say segments positioned in parts of the image expected to include known parts of the face, say nose, lips, or mouth) of the captured image are connected to form a polygon. A verified symmetry of the polygon serves as an indication for the symmetry of the face, as described in further detail hereinabove.

Optionally, the symmetry criterion is applied on a map representation of the image. The map representation may include, but is not limited to: an intensity map, a phase map, a texture map (i.e. gradient map), or any other map generated from the image using standard image processing filters, as known in the art.

The symmetry criterion may be defined before the images (or features extracted from the images, say biometric stamps, as known in the art) are stored in the face database, as described in further detail hereinbelow.

Optionally, the symmetry criterion is formulated as a threshold value for symmetry, as known in the art. The threshold value may be a theoretical value based on theoretical calculations, an empirical value derived from experimental data, etc.

When a face in a new image (say a face of an individual who wishes to be granted access to a classified information system) needs to be identified, the new image is tested with respect to symmetry of the face in the new image. That is to say that the face has to comply with the symmetry criterion before an attempt is made at identifying the face using the database of faces.

Thus, according to an exemplary embodiment of the present invention, the symmetry criterion is enforced on all faces identified in images, using the methods and apparatuses taught hereinbelow.

The symmetry criterion may improve accuracy and efficiency of identification of the face in the image. For example, in order to meet the face criterion, the face is aligned into a position where the face appears symmetric (say a position where an individual looks straight into a camera). Consequently, there is produced a significantly uniform face alignment amongst the images.

The uniform face alignment may ease identification of a face in a new image, through a comparison with images in the face database. The identification is eased, since the uniform face alignment may increase similarity between face images of the same individual, especially as far as two dimensional (2D) images are concerned. Consequently, face recognition rates, such as FAR (False Acceptance Rate) and FRR (False Rejection Rate), may be reduced, and thus improved.

Further, when an individual has to align his face into the position where the individual's face appears symmetric, the individual is less likely to use extreme facial expressions. Extreme facial expressions (such as a widely opened mouth) are known to posses a problem, as far as face recognition (i.e. identification) is concerned.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components as set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram illustrating a first apparatus for face recognition, according to an exemplary embodiment of the present invention.

Apparatus 1000 for face recognition includes a face symmetry verifier 110.

The face symmetry verifier 110 verifies symmetry of a face in one or more image(s), (say a still video image of a face of an individual, a sequence of video images of an individual, etc.) according to a symmetry criterion, as described in further detail hereinabove.

Optionally, the symmetry criterion pertains to a statistical model run over previously received images. For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth). The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined by a user of the apparatus 1000, as described in further detail hereinbelow. Optionally, the face symmetry verifier 110 uses an intensity map, for verifying the symmetry of the face in the image, as described in further detail hereinbelow.

Optionally, the face symmetry verifier 110 uses a texture map (i.e. a gradient map), for verifying the symmetry of the face in the image, as described in further detail hereinbelow.

Optionally, the face symmetry verifier 110 uses a Fast Fourier Transform (FFT) phase map, for verifying the symmetry of the face in the image, as described in further detail.

Optionally, the face is a face of an individual who is a collaborating user. For example, the face may belong to a user who may be asked to move into a better position. The user collaborates by moving into a better aligned position (say a position where the user looks directly into a still camera). A new image of the user's face, as captured from the better aligned position, may be more symmetric, as described in further detail hereinbelow.

Optionally, the images are a part of a video sequence, and the video sequence is continuously fed to the face symmetry verifier 110, say from a surveillance system or device (such as a video camera which continuously captures images of a secure area), as described in further detail hereinbelow.

The face symmetry verifier 110 verifies the symmetry of face in each of the images. When the face symmetry verifier 110 successfully verifies the symmetry of the face in one of the images (say the face of a criminal), the image is forwarded to a face symmetry verifier, as described in further detail hereinbelow.

Optionally, the face symmetry verifier 110 measures symmetry of each one of two or more images of the video sequence fed to the face symmetry verifier 110. Then, the face symmetry verifier 110 selects the one or more image(s) of the face amongst the input images, such that the measured symmetry of the selected images of the face is highest amongst the input images.

Apparatus 1000 further includes a face identifier 120, connected to the face symmetry verifier 110.

The face identifier 120 identifies the face, provided the symmetry of the face is successfully verified by the face symmetry verifier 110, as described in further detail hereinbelow.

The face identifier 120 may use any of current face identification methods.

Optionally, the face identifier 120 identifies the face by attempting to match between the image bearing the face and images in a database of images, or between a feature (say a biometric stamp) extracted from the image bearing the face and features previously extracted from images previously received and stored in a face database, as known in the art and described in further detail hereinabove.

The symmetry criterion may improve accuracy and efficiency of the face identifier 120, as described in further detail hereinabove.

Optionally, apparatus 1000 further includes an image capturer, connected to the face symmetry verifier 110.

The image capturer may include, but is not limited to a digital still camera, a video camera, etc. The image capturer captures the image(s) of the face, and forwards the captured image(s) to the face symmetry verifier 110.

Optionally, when the face symmetry verifier 110 finds the face in the image non-symmetric (i.e. when the face fails to meet the symmetry criterion), the face symmetry verifier 110 instructs the image capturer to capture a new image of the face.

Optionally, upon finding the face non-symmetric, the face symmetry verifier 110 presents an appropriate message (say a message asking an individual whose face image is captured to look straight into the image capturer, etc.), and the face capturer captures a new image of the face, as described in further detail hereinbelow.

Optionally, apparatus 1000 further includes a face detector, connected to the face symmetry verifier 110.

The face detector detects the face in the image. The face detector may use one or more methods for detecting the face in the image, including, but not limited to: a skin detection method, a Viola-Jones detection method, a Gabor Filter based method, etc., as described in further detail hereinbelow.

Optionally, apparatus 1000 also includes an image cropper, connected to the face symmetry verifier 110.

The image cropper crops the image, and thereby significantly removes background details from the image.

Optionally, the image cropper crops the image around the face, leaving a purely facial image (i.e. an image which includes only the face, without background details).

Optionally, the image cropper crops the image, along a rectangle, as illustrated using FIG. 13, and described in further detail hereinbelow.

Optionally, apparatus 1000 also includes an image resizer, connected to the face symmetry verifier 110.

The image resizer resizes the image into a predefined size, and thereby standardizes the image's size according to a size standard predefined by a user of the apparatus 1000, as described in further detail hereinbelow.

Optionally, apparatus 1000 further includes an image illumination quality improver, connected to the face symmetry verifier 110.

The image illumination quality improver may improve one or more qualities of illumination of the image, say using Histogram Equalization, as known in the art, and described in further detail hereinbelow.

Reference is now made to FIG. 2, which is a block diagram illustrating a second apparatus for face recognition, according to an exemplary embodiment of the present invention.

Apparatus 2000 for face recognition includes a face symmetry verifier 210.

The face symmetry verifier 210 verifies symmetry of a face in one or more image(s), (say a still video image of a face of an individual, or a sequence of video images of an individual), according to a symmetry criterion, as described in further detail hereinabove.

Optionally, the symmetry criterion pertains to a statistical model run over previously received images. For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined by a user of the apparatus 2000, as described in further detail hereinbelow.

The symmetry criterion may be based on an intensity map, a phase map, a texture map, etc., as described in further detail hereinbelow.

Optionally, the face symmetry verifier 210 uses an intensity map, a gradient map, a Fast Fourier Transform (FFT) phase map, or a combination thereof, for verifying the symmetry of the face in the image(s), as described in further detail hereinbelow.

Optionally, the face symmetry verifier 210 measures symmetry of each one of two or more input images (say images which are a part of a sequence of video images, or a video stream). Then, the face symmetry verifier 210 selects the one or more image(s) of the face amongst the input images, such that the measured symmetry of the selected images of the face is highest amongst the input images.

Apparatus 2000 further includes a face database updater 230, connected to the face symmetry verifier 210.

The face database updater 230 updates a face database 250 with the image of the face or with one or more features extracted from the image (say with a biometric stamp, as known in the art), and with associated data identifying the face, provided the symmetry of the face in the image(s) is successfully verified by the face symmetry verifier 210, as described in further detail hereinbelow.

The data identifying face may include, but is not limited to details such as a passport number, a name, or an address. The details may be provided by an operator of the apparatus 2000, by an individual whose face is captured in the image, etc.

The face database 250 may be a local database, a remote database accessible through a wide area network (such as the Internet), etc., as known in the art.

Reference is now made to FIG. 3, which is a block diagram illustrating a third apparatus for face recognition, according to an exemplary embodiment of the present invention.

Apparatus 3000 for face recognition includes a face symmetry verifier 310.

The face symmetry verifier 310 receives one or more first image(s) of a face, together with data identifying the face. The data identifying the face may include, but is not limited to details such as a passport number, a name, or an address. The details may be provided by an operator of the apparatus 3000, by an individual whose face is captured in the image, etc.

The face symmetry verifier 310 verifies symmetry of a face in one or more first image(s), according to a symmetry criterion, as described in further detail hereinabove.

Optionally, the symmetry criterion pertains to a statistical model run over previously received images.

For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth). The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

In one example, the first image includes a still video image of a face of an individual who enrolls in a security system, or a sequence of video images of a known criminal the police wishes to store in a database of criminal suspects.

The symmetry criterion may be defined by a user of the apparatus 3000, as described in further detail hereinbelow.

The symmetry criterion may be based on an intensity map, a phase map, a texture map, etc., as described in further detail hereinbelow.

Optionally, the face symmetry verifier 310 uses an intensity map, a gradient map, a Fast Fourier Transform (FFT) phase map, or a combination thereof, for verifying the symmetry of the face in the first image(s), as described in further detail hereinbelow.

Optionally, the face symmetry verifier 310 measures symmetry of each one of two or more images input to the face symmetry verifier 310, say images which are a part of a sequence of video images streamed to the face symmetry verifier 310. Then, the face symmetry verifier 310 selects one or more first image(s) of the face amongst the input images, such that the measured symmetry of the selected image(s) of the face is highest amongst the input image(s).

Apparatus 3000 further includes a face database updater 330, connected to the face symmetry verifier 310.

Optionally, the face database updater 330 updates a face database 350 with one or more of the first image(s) or with one or more features extracted from the first image(s) (say a biometric stamp, as known in the art), and the data identifying the face, provided the symmetry of the face in the first image(s) is successfully verified, as described in further detail hereinbelow.

Optionally, the face database updater 330 updates the face database with the images selected by the face symmetry verifier 310, or with one or more features extracted from the selected images (say biometric stamps, as known in the art), as described in further detail hereinabove.

The face database 350 may be a local database, a remote database accessible through a wide area network (such as the Internet), etc., as known in the art.

Apparatus 3000 further includes a face identifier 320, connected to the face symmetry verifier 310.

When one or more second image(s) of a face are presented to the face symmetry verifier 310 (say, a video stream of an individual who attempts to walk into a secure area), the face symmetry verifier 310 verifies the symmetry of the face in the second image(s), according to the predefined symmetry criterion.

If the symmetry of the face in the second image is successfully verified, the face identifier 320 identifies the face in the second image, using the face database 350. For example, the face identifier 320 may identify the face by matching a feature extracted from the second image (such as a biometric stamp) and a feature previously extracted from one of the first images and stored in the face database 350, as described in further detail hereinabove.

In one example, an authorized user of classified information system enrolls in the classified information system.

A first image of the authorized user's face is input to the face symmetry verifier 310 (say a passport photo), together with data identifying the authorized user.

The data indemnifying the user may include, but is not limited to details such as a passport number, a name, an address, a role, etc. The details may be provided by an operator of the apparatus 3000, by the authorized user, etc.

If the face symmetry verifier 310 verifies the symmetry of the authorized user's face in the first image, the face database updater 330 updates the face database 350 with the first image of the authorized user (or with a feature extracted from the first image), together with the data identifying the authorized user, as described in further detail hereinabove.

The next time the authorized user wishes to log into the classified information system, a second image of his face is captured live, say by a still camera in communication with the classified information system.

The face symmetry verifier 310 receives the second image and verifies the symmetry of the authorized user's face in the second image.

When the symmetry of the authorized user's face in the second image is successfully verified, the face identifier 320 identifies the face in the second image, using the face database 350. Optionally, the face identifier 320 identifies the face by extracting a biometric stamp from the second image and finding a matching biometric stamp in the face database 350, as described in further detail hereinabove.

Consequently, upon positive identification of the authorized user's face, the authorized user is allowed to log into the classified information system.

Reference is now made to FIG. 4, which is a block diagram illustrating a fourth apparatus for face recognition, according to an exemplary embodiment of the present invention.

Apparatus 4000 for face recognition includes a face symmetry verifier 410.

The face symmetry verifier 410 verifies symmetry of a face in one or more image(s) (say a still video image of a face of an individual, or a sequence of video images of an individual) according to a symmetry criterion, as described in further detail hereinabove.

Optionally, the symmetry criterion pertains to a statistical model run over previously received images.

For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined by a user of the apparatus 4000, as described in further detail hereinbelow.

The symmetry criterion may be based on an intensity map, a phase map, a texture map, etc., as described in further detail hereinbelow.

Optionally, the face symmetry verifier 410 uses an intensity map, a gradient map, a fast Fourier Transform (FFT) phase map, an image processing filter output (as known in art), or a combination thereof, for verifying the symmetry of the face in the image(s), as described in further detail hereinbelow.

Apparatus 4000 further includes a forwarding controller 470, connected to the face symmetry verifier 410.

The forwarding controller 470 controls the forwarding of the image (or a feature extracted from the image, say a biometric stamp, as known in the art), in accordance with the verification of the symmetry of the face.

In a first example, the face symmetry verifier 410 may find the face in the image to be non-symmetric (i.e. when the face fails to meet the symmetry criterion). Consequently, the forwarding controller 470 blocks the forwarding of the image (or the feature extracted from the image) to an image identifier 120.

Optionally, the forwarding controller 470 presents an appropriate message.

For example, the forwarding controller 470 may present a message asking an individual whose face image is captured to look straight into an image capturer (say, a still camera), or to align in a position in front of the image capturer, as described in further detail hereinbelow.

Then, the image capturer may capture a new (and hopefully, symmetric) image of the face of the individual.

When the face symmetry verifier 410 finds that the face successfully meets the symmetry criterion (and is thus successfully verified as symmetric), the forwarding controller 470 may forward the image (or the feature extracted from the image), say to an image identifier 120, as described in further detail hereinabove.

In a second example, the forwarding controller 470 may forward the image (or the feature extracted from the image) to one or more destination(s) set in advance of the verification of the symmetry, say by an operator of the apparatus 4000.

The destination(s) may include, but is not limited to: an email address, a database server, or an application (which may run on a remote computer, on a computer the forwarding controller also runs on, etc.).

Apparatus 4000 may be used as a stand alone product, or in combination with other systems, say a face recognition system, a security system, etc.

Reference is now made to FIG. 5, which is a flowchart illustrating a first method for face recognition, according to an exemplary embodiment of the present invention.

In a first method for face recognition, according to an exemplary embodiment of the present invention, symmetry of a face in one or more image(s), (say a still video image of a face of an individual, a sequence of video images of an individual, etc.) is verified 510 according to a symmetry criterion, say using the face symmetry verifier 110, as described in further detail hereinabove.

Optionally, the symmetry criterion pertains to a statistical model run over previously received images.

For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined in advance, say by a user of apparatus 1000, as described in further detail hereinabove.

The symmetry criterion may be based on an intensity map, a phase map, a texture map, an image processing filter, etc., as described in further detail hereinbelow.

Optionally, the first method further includes using an intensity map, for verifying 510 the symmetry of the face in the image, as described in further detail, hereinbelow.

Optionally, the first method further includes using a gradient map, for verifying 510 the symmetry of the face in the image, as described in further detail, hereinbelow.

Optionally, the first method further includes using a fast Fourier Transform (FFT) phase map, for verifying 510 the symmetry of the face in the image, as described in further detail, hereinbelow.

Optionally, the first method further includes measuring symmetry of each one of two or more input images (say images which are a part of a sequence of video images, or a video stream). Then, the one or more image(s) of the face are selected amongst the input images, such that the measured symmetry of the selected images of the face is highest amongst the input images.

Next, the face is identified 520, say by the face identifier 120, provided the symmetry of the face is successfully verified 510.

For example, the face may be identified by attempting to match between the image bearing the face and images previously stored in a database of images. The face may also be identified by finding a match between a feature (such as biometric method) extracted from the image bearing the face, and a feature previously extracted from an image and stored in a face database, as known in the art and described in further detail hereinbelow.

Optionally, the first method further includes a preliminary step of capturing the image of the face, and forwarding the captured image, for the symmetry verification, (say to the face symmetry verifier 110), as described in further detail hereinabove.

Optionally, the first method further includes detecting the face in the image, say using the face detector, as described in further detail hereinbelow.

The detection of the face may be carried out using one or more methods including, but not limited to: a skin detection method, a Viola-Jones detection method, a Gabor Filter based method, etc., as described in further detail hereinbelow.

Optionally, the first method further includes cropping the image.

Optionally, the cropping is carried out around the face, and thereby leaves a purely facial image (i.e. an image substantially without background).

Optionally, the cropping may be carried out along a rectangle, significantly removing background from the image, as illustrated using FIG. 13, and described in further detail hereinbelow.

Optionally, the first method further includes resizing the image into a predefined size, and thereby standardizing the image's size according to a predefined size standard, as described in further detail hereinbelow.

Optionally, the first method further includes improving one or more qualities of illumination of the image, say using a Histogram Equalization method, as described in further detail hereinbelow.

Reference is now made to FIG. 6, which is a flowchart illustrating a second method for face recognition, according to an exemplary embodiment of the present invention.

In a second method for face recognition, according to an exemplary embodiment of the present invention, symmetry of a face in one or more image(s), (say a still video image of a face of an individual, a sequence of video images of an individual, etc.) is verified 610 according to a symmetry criterion, say using the face symmetry verifier 210, as described in further detail hereinabove.

Optionally, the symmetry criterion pertains to a statistical model run over previously received images. For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined by a user of apparatus 2000, as described in further detail hereinabove.

Optionally, the second method further includes using an intensity map, for verifying 610 the symmetry of the face in the image, as described in further detail, hereinbelow.

Optionally, the second method further includes using a gradient map, for verifying 610 the symmetry of the face in the image, as described in further detail, hereinbelow.

Optionally, the first method further includes using a fast Fourier Transform (FFT) phase map, for verifying 610 the symmetry of the face in the image, as described in further detail, hereinbelow.

Optionally, the first method further includes measuring symmetry of each one of two or more input images (say images which are a part of a sequence of video images, or a video stream). Then, the one or more image(s) of the face are selected amongst the input images, such that the measured symmetry of the selected images of the face is highest amongst the input images.

Next, a face database 250 is updated 620 with the image of the face or with one or more features (say biometric stamps, as known in the art) extracted from the image of the face and with associated data identifying the face, provided the symmetry of the face in the image(s) is successfully verified (say by the face symmetry verifier 210), as described in further detail hereinabove.

The data identifying face may include, but is not limited to details such as a passport number, a name, or an address. The details may be provided by an operator of the apparatus 2000, by an individual whose face is captured in the image, etc.

The face database 250 may be a local database, a remote database accessible through a wide area network (such as the Internet), etc., as known in the art.

Reference is now made to FIG. 7, which is a flowchart illustrating a third method for face recognition, according to an exemplary embodiment of the present invention.

In a third method, according to an exemplary embodiment of the present invention, symmetry of a face in one or more first image(s) is verified 710, according to a symmetry criterion, say using the face symmetry verifier 310, as described in further detail hereinabove.

Optionally, the symmetry criterion pertains to a statistical model run over previously received images. For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon, and a verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

In one example, the first image(s) may include a passport photo of an individual who enrolls in a security system, a sequence of video images of a known criminal the police wishes to store in a database of criminal suspects, etc.

The symmetry criterion may be defined by a user of the apparatus 3000, as described in further detail hereinabove.

Optionally, the verification of the symmetry of the first image(s) is carried out using an intensity map, a texture map (i.e. gradient map), a fast Fourier Transform (FFT) phase map, or a combination thereof, as described in further detail hereinbelow.

Next, a face database 350 is updated 730 with the first image(s) of the face (or with features extracted from the first image(s), as described in further detail hereinabove), and with associated data identifying the face, provided the symmetry of the face in the first image(s) is successfully verified 710, say by the face symmetry verifier 310, as described in further detail hereinbelow.

The data identifying face may include, but is not limited to details such as a passport number, a name, or an address. The details may be provided by an operator of the apparatus 4000, by the individual whose face is captured in the image, etc.

The face database 350 may be a local database, a remote database accessible through a wide area network (such as the Internet), etc., as known in the art.

When one or more second image(s) of the face are presented to the face symmetry verifier 310 (say, a video stream of a criminal who attempts to walk into a secure area), the symmetry of the face in the second image(s) is verified 770, according to the predefined symmetry criterion, as described in further detail hereinabove.

If the symmetry of the face in the second image is successfully verified 770, the face in the second image is identified 790, say by the face identifier 320, using the face database 350.

Optionally, the face is identified 790 by finding a match between the second image and an image stored in the face database 350 (or between a feature extracted from the second image and features stored in the face database 350), as known in the art and described in further detail hereinabove.

For example, a police unit may wish to store a face image and identifying data of a known criminal in a suspect database. The symmetry of the known criminal's face in the first image is verified 710, say using the face symmetry verifier 310, as described in further detail hereinbelow.

If the symmetry of the known criminal's face in the first image is successfully verified 710, the suspect database is updated 730 with the first image of the known criminal, together with the data identifying the known criminal.

A surveillance camera may capture a video stream (i.e. second images of the criminal) of the criminal in a crime scene.

The video stream may be used to identify the criminal, say using apparatus 3000, as described in further detail hereinbelow.

When the symmetry of the criminal's face in the second image is successfully verified 770, the face in the second image may be identified 790, using the police unit's suspect database. Consequently, upon positive identification of the criminal's face, the police may arrest the known criminal, and use the video stream as evidence against the known criminal.

Reference is now made to FIG. 8, which is a flowchart illustrating a fourth method for face recognition, according to an exemplary embodiment of the present invention.

In a fourth method, according to an exemplary embodiment of the present invention, an image of a face is captured 800, say using an image capturer, such as a digital still camera, a video camera, or a surveillance camera (which constantly streams video images of a secure area).

For example, a user may approach a face recognition system, which includes apparatus 1000, and the image capturer.

Optionally, the image capturer may be triggered to capture the image of a user who approaches the face recognition system by a smart card reader connected to the image capturer.

Upon insertion of a smart cart into the smart card reader, by the user, the smart card reader triggers the image capturer, to capture the image of the user. Then, the captured image is forwarded for symmetry verification, as described in further detail hereinbelow.

Similarly, the image capturer may be triggered to capture the image of the face of the user who approaches the face recognition system, by a RFID (Radio frequency identification) card reader connected to the image capturer. The RFID card reader triggers the image capturer to capture the image, when the user inserts an RFID cart into the RFID reader. Then, the captured image is forwarded for symmetry verification, as described in further detail hereinbelow.

Optionally, the image capturer continuously captures images. For example, the imager capturer may be a surveillance camera, which constantly streams video images of a secure area. Upon detection of the user's face in the image (say by the face detector), the image is forwarded to the face symmetry verifier 110, as describe in further detail hereinabove.

Optionally, the image is captured in a two dimensional (2D) format, as known in the art.

Optionally, the image is captured in a three dimensional (3D) format, as known in the art.

Next, the face in the captured image is verified 810, according to a symmetry criterion, say by the face symmetry verifier 110, as described in further detail hereinabove.

Optionally, when the face in the image is found to be non-symmetric (i.e. the face fails to meet the symmetry criterion), the image capturer is instructed (say by the face symmetry verifier 110) to capture a new image of the face.

The image capturer may present an appropriate message, say a message asking an individual whose face image is captured to look straight into the image capturer, or align in a position in front of the image capturer (say, a still camera), as described in further detail hereinbelow.

Then, the image capturer captures a new image of the face.

When the symmetry of the face is successfully verified 810, the image is pre-processed 880, using one of several pre-processing methods currently used for face recognition. The pre-processing methods may be used for sharpening, grey scale modification, removal of red eyes, etc., as known in the art.

Finally, the face is identified 890, say by the face identifier 120, as described in further detail hereinabove.

Reference is now made to FIG. 9, which is a flowchart illustrating a fifth method for face recognition, according to an exemplary embodiment of the present invention.

In a fifth method, according to an exemplary embodiment of the present invention, a video image is captured 900, say by a video still camera, as described in further detail hereinabove.

Next, there is detected 901 a face in the captured image.

The face may be detected using one or more methods for detecting a face in the image. The methods include, but not limited to: Viola-Jones detection methods, Gabor Jets based methods, skin detection methods, histogram analysis methods, or other methods (say methods based on edge maps, gradients, or standard face shapes, etc.), as known in the art.

Viola-Jones methods use several image processing filters over the whole image. A neural network algorithm is trained over a training set (say a set of already processed face images). The face is detected using a neural network algorithm and a search is made to find best match values that predict the face center location, as known in the art.

Gabor Jets methods use a convolution of a Fourier Coefficient of the image with wavelets coefficients of low order, where the values that predict face location are set according to empirically found predictive values, as known in the art.

Skin detectors analyze an intensity map presentation of the image, in order to find that pixel intensity values which comply with standard skin values, as known in the art.

Histogram analysis methods analyze a histogram of the image, say a Pixel Frequency Histogram, after applying several filters (histogram normalization, histogram stretching, etc.) on the histogram of the image. The filters applied on the image's histogram may enable separation of face from background, as known in the art.

Next, the image is cropped 902, and thus background is significantly removed from the image, as illustrated using FIG. 13, and described in further detail hereinbelow.

Then, the cropped image is resized 903 into a size, in accordance with a side standard. The size standard may be set by an operator of the apparatus 1000.

The size standard may improve accuracy and efficiency of identification of the face, since images in a database of face images, which are substantially the same size as the resized image, are more likely be matched with the resized image, for identifying the face, as described in further detail hereinabove.

Next, there are improved 904 one or more illumination qualities of the image.

For example, the illumination qualities of the image may be enhanced using Histogram Equalization, which modifies the dynamic range and contrast of an image by altering the image.

Optionally, the histogram equalization employs a monotonic, nonlinear mapping, which re-assigns the intensity values of pixels in the image, such that the improved image contains a uniform distribution of intensities (i.e. a flat histogram).

Histogram Equalization is usually introduced using continuous (rather than discrete) process functions, as known in the art.

Optionally, the histogram equalization employs linear mapping, exponential (or logarithmic) mapping, etc., as known in the art.

Next, the symmetry of the face in the image is verified 907, using a symmetry criterion, as described in further detail hereinbelow.

Upon successful verification 915 of the symmetry of the face in the image, there is identified 920 the face in the image, as described in further detail hereinabove. If the image is found to be non-symmetric (i.e. if the image fails to comply with the symmetry criterion), an image of the face is captured again 900, as described in further detail hereinabove.

The symmetry criterion may be based on an intensity map of the image, a phase map of the image, a texture map of the image, etc., and is predefined before the images are stored in a face database.

In the face database, there are stored images of known faces (or features extracted from images of the known faces, say biometric stamps, as known in the art), which also meet the face criterion, as described in further detail hereinbelow.

Thus, according to exemplary embodiments of the present invention, the symmetry criterion is enforced on all face images the method is used on.

The symmetry criterion may improve accuracy and efficiency of identification of the face in the image.

For example, in order to meet the face criterion, the face is aligned into a position where the face appears symmetric (say a position where an individual looks straight into a camera).

Consequently, there is produced a significantly uniform face alignment amongst the images.

The uniform face alignment may ease identification of a face in a new image, through comparison with images in a face database (or with features extracted images and stored in the face database). The identification may be eased, since the uniform face alignment may increase similarity between face images of the same individual, especially as far as two dimensional (2D) images are concerned.

Consequently, face recognition rates, such as FAR (False Acceptance Rate) and FRR (False Rejection Rate), may be reduced.

Further, when an individual has to align his face into the position where the individual's face appears symmetric, the individual is less likely to use extreme facial expression. Extreme facial expressions (such as a widely opened mouth) are known to posses a problem, as far as face recognition (i.e. identification) is concerned.

Reference is now made to FIG. 10, which is a flowchart illustrating a sixth method for face recognition, according to an exemplary embodiment of the present invention.

In a sixth method for face recognition, according to an exemplary embodiment of the present invention, symmetry of a face in one or more image(s), (say a still video image of a face of an individual, a sequence of video images of an individual, etc.) is verified 1010 according to a symmetry criterion.

Optionally, the symmetry is verified using the face symmetry verifier 410, as described in further detail hereinabove.

Optionally, the symmetry criterion pertains to a statistical model run over previously received images.

For example, the symmetry criterion may be based on a degree of deviation of the image (and thus the face captured in the image) from an average image, as described in further detail hereinabove.

Optionally, the symmetry criterion is based on a comparison made between the image and one or more images previously captured from the same face, as described in further detail hereinabove.

Optionally, the symmetry criterion is based on symmetry of a polygon, which connects selected parts of the image.

Optionally, the selected parts are known elements of a human face (say nose, eyes, or mouth).

The known elements may be identified in the captured image using known in art techniques, such as: Viola-Jones algorithms, Neural Network methods, etc. The centers of the known face elements identified in the captured image are connected to form the polygon. The verified symmetry of the polygon serves as an indication for the symmetry of the face in the captured image, as described in further detail hereinabove.

Optionally, the selected parts are segments of the face in the image.

The segments are identified in the captured image, using known in the art image segmentation methods, such as Feature Oriented Flood Fill, Texture Analysis, Principal Component Analysis (PCA) based methods, DFT (Discrete Fourier Transform) methods (i.e. harmonic methods), etc., as described in further detail hereinabove.

The symmetry criterion may be defined by a user of apparatus 4000, as described in further detail hereinbelow.

Optionally, the sixth method further includes using an intensity map, for verifying 1010 the symmetry of the face in the image, as described in further detail hereinbelow.

Optionally, the sixth method further includes using a gradient map, for verifying 1010 the symmetry of the face in the image, as described in further detail hereinbelow.

Optionally, the sixth further includes using a fast Fourier Transform (FFT) phase map, for verifying 1010 the symmetry of the face in the image, as described in further detail, hereinbelow.

Next, the forwarding of the image (or features extracted from the image) is controlled 1070, say by the forwarding controller 470, as described in further detail hereinabove.

For example, when the face in the image to is found to be non-symmetric (i.e. when the face fails to meet the symmetry criterion), the forwarding of the image to a face identifier 110, or to another destination (say a destination set by an Operator of apparatus 4000) may be blocked.

Reference is now made to FIG. 11, which is a flowchart illustrating a seventh method for face recognition, according to an exemplary embodiment of the present invention.

A seventh method, according to a preferred embodiment of the present invention uses an intensity map of a image captured, say by an image capturer (a still camera, a video camera, etc.).

In the seventh method, the face is found 1101 in the image, as described in further detail hereinabove.

Next, the image is cropped 1102, say 15% in each side (top, bottom, right and left), along a rectangle, as described in further detail, and illustrated using FIG. 13 hereinbelow.

The cropped image is resized 1103, say to hundred on hundred pixels.

Optionally, the image is modified, using histogram equalization 1104 (say Linear Histogram Equalization), as described in further detail hereinabove.

Next, there is verified the symmetry of the face in the image through the following:

The image is divided 1105 into two equal parts: a left side and a right side, along a vertical line passing through a point in the middle of the image.

Next, an average pixel intensity is calculated 1106 using all pixels of the right part.

The average pixel intensity is denoted hereinbelow as: Right Avg.

An average intensity is also calculated 1106 using all pixels of the left part, and denoted hereinbelow as: Left Avg.

Next, the left side is transformed 1107. For each old pixel $P_{old\ (i,j)}$ of the left size, there is computed a new value using Formula I, yielding a corresponding new value for the pixel, denoted hereinbelow as $P_{new\ (i,j)}$.

$$P\text{ new}(i, j) = \frac{P\text{ old}(i, j) \times Right\ Avg.}{Left\ Avg.} \quad \text{Formula 1}$$

The new pixel values $P_{new\ (i,j)}$ form a new image, which comprises the new values calculated for the pixels of the left side, and the original values of the pixels of the right side. The new image is denoted hereinbelow as: $I_{new}$.

Next the new image $I_{new}$ is flipped 1108 over a central vertical line, to form a flipped image denoted hereinbelow as $I_{flipped}$.

Then, for each of pixel (I, J) there is computed a difference 1109 between intensity of the pixel in $I_{new}$ and the intensity of the pixel in $I_{flipped}$, using Formula 2:

$$\text{Diff } i,j = |I\text{ new}(i,j) - I\text{ flipped}(i,j)| \quad \text{Formula 2}$$

The resultant difference is denoted: Diff i,j.

Next, there is computed 1110 the symmetry of the face by dividing the average of the differences (Diff i,j) of intensities of the pixels calculated using Formula 2, by the average of intensities of the pixels of $I_{new}$, as formulated by Formula 3:

$$\text{Symmetry} = \frac{Avg\ (Diff\ i,\ j)}{Avg\ (I\ new)} \quad \text{Formula 3}$$

According to an exemplary embodiment, the threshold for symmetry i.e. symmetry criterion) is set at 0.35. If Symmetry<0.35, the face is successfully verified 1111 as symmetric. If Symmetry>=0.35, the face is determined to be non-symmetric, and a new image has to be captured, as described in further detail hereinabove.

Reference is now made to FIG. 12, which is a flowchart illustrating an eighth method for face recognition, according to an exemplary embodiment of the present invention.

An eighth method, according to a preferred embodiment of the present invention uses a phase map of an image captured (say by an image capturer (a still camera, a video camera, etc.). The phase map may be calculated using Fourier Transform (FT), as known in the art.

In the eighth method, the face is found 1201 in the image, as described in further detail hereinabove.

Next, the image is cropped 1202 15% in each side (top, bottom, right and left), along a rectangle, as described in further detail, and illustrated using FIG. 13 hereinbelow.

The cropped image is resized 1203, say to hundred on hundred pixels.

Optionally, the image is modified, using histogram equalization 1204 (say Linear Histogram Equalization), as described in further detail hereinabove.

Next, there is verified the symmetry of the face in the image, through the following:

The image is divided 1205 along a vertical line, into equal parts: a left side and right side.

Next, the right side is flipped 1206 vertically.

Next, there is computed 1207 the Fourier Transform (FT) for the right side and for the left side. The resultant phase maps are denoted hereinbelow as $I_{right}$ and $I_{left}$ respectively.

Next, there is computed 1208 the difference between $I_{right}$ and $I_{left}$, using Formula 4, where Diff denotes the difference between the two.

$$\text{Diff} = |I\text{ right} - I\text{ left}| \quad \text{Formula 4}$$

Next, there is computed 1209 symmetry for the image, using Formula 5.

$$\text{Symmetry} = \left\| \frac{Diff}{\text{Number of pixels of half image}} \right\| \quad \text{Formula 5}$$

According to an exemplary embodiment, the threshold for symmetry (i.e. the symmetry criterion) is set at 35. If Symmetry<35, the face is successfully verified 1210 as symmetric. If Symmetry>=35, the face is determined to be non-symmetric, and a new image has to be captured, as described in further detail hereinabove.

Reference is now made to FIG. 13, which illustrates cropping of an image of a face, according to an exemplary embodiment of the present invention.

According to an exemplary embodiment of the present invention, an image of a face may be cropped, say 15% of each size, a long a rectangle. Consequently the background is significantly removed from the image.

The cropping of the image may result in a more efficient and accurate face recognition, as the identifying is carried out on the face 1311 itself, without unnecessary processing of background details, such as a collar 1312, which have nothing to do with the face itself.

The removal of the background details may also ease identification of a face, by introducing increased similarity between face images of the same individual, especially as far as two dimensional (2D) images are concerned.

The methods for face recognition, as described hereinabove, may also be used in a variety of systems where symmetry information may prove helpful.

The systems may include, but are not limited to: 2D or 3D systems, security system, access control, HLS (Home Land Security), ATM (Automatic Teller Machines), web portals, or any application which requires recognition of the subject.

The systems may also include: passport picture capturing, standard image capturing (thus enforcing a standard for image capturing, say for e-Passport or e-ID generation, as known in the art).

Optionally, the apparatuses for face recognition, as described in further detail hereinabove, may be used on-line for real time applications, or off-line (say on a database of face images).

The apparatuses for face recognition may be implemented using a Personal Computer, an embedded system, a FPGA (Field Programmable Gate Array), or any other computing device, as known in the art.

Reference is now made to FIGS. 14A, 14B, and 14C, which illustrate a face recognition scenario, according to an exemplary embodiment of the present invention.

In a first recognition scenario, according to an exemplary embodiment of the present invention, a user approaches a face recognition system, say a face recognition system based on apparatus 3000, as described in further detail hereinabove.

The user may be asked to get closer to a camera (say using a message displayed on a video monitor), as illustrated in FIG. 14A.

Next, an image of the user's face is captured by the camera.

If the face symmetry verifier 310 finds the face in the image to be non-symmetric, the user is asked to look straight into the camera (say using a message displayed on a video monitor), as illustrated in FIG. 14B.

The camera captures a second image of the user who looks straight into the camera. As the user looks straight into the camera, the face symmetry verifier 310 verifies that the user's face in the second image are indeed symmetric, as described in further detail hereinabove. Consequently, the second image is forwarded to the face identifier 320, which identifies the user.

Upon successful identification of the user a relevant message is presented to the user, say a welcome message, as illustrated in FIG. 14C.

It is expected that during the life of this patent many relevant devices and systems will be developed and the scope of the terms herein, particularly of the terms "Camera", "Image", and "Photo", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for face recognition, the apparatus comprising: a face symmetry verifier, configured to verify symmetry of a face in at least one image, according to a predefined criterion of symmetry in a direction fixed with respect to variation in position of eyes in the image; and a face identifier, associated with said face symmetry verifier, and configured to identify said face, provided said symmetry of said face is successfully verified.

2. The apparatus of claim 1, further comprising an image capturer, associated with said face symmetry verifier, and configured to capture said image of said face.

3. The apparatus of claim 1, further comprising a face detector, associated with said face symmetry verifier, and configured to detect said face in said image.

4. The apparatus of claim 3, wherein said face detector is further configured to use a skin detection method, for detecting said face in said image.

5. The apparatus of claim 3, wherein said face detector is further configured to use a Viola-Jones detection method, for detecting said face in said image.

6. The apparatus of claim 3, wherein said face detector is further configured to use a Gabor Filter based method, for detecting said face in said image.

7. The apparatus of claim 1, further comprising an image cropper, associated with said face symmetry verifier, and configured to crop said image, thereby to remove background from said image.

8. The apparatus of claim 1, further comprising an image resizer, associated with said face symmetry verifier, and configured to resize said image into a predefined size.

9. The apparatus of claim 1, further comprising an image illumination quality improver, associated with said face symmetry verifier, and configured to improve a quality of illumination of said image.

10. The apparatus of claim 9, wherein said image illumination quality improver is further configured to use Histogram Equalization, for improving said quality of illumination of said image.

11. The apparatus of claim 1, wherein said face symmetry verifier is further configured to use an intensity map, for verifying said symmetry of said face in said image.

12. The apparatus of claim 1, wherein said face symmetry verifier is further configured to use a gradient map, for verifying said symmetry of said face in said image.

13. The apparatus of claim 1, wherein said face symmetry verifier is further configured to use a Fourier Transform phase map, for verifying said symmetry of said face in said image.

14. The apparatus of claim 1, wherein said face symmetry verifier is further configured to measure symmetry of each one of a plurality of input images, and select said at least one image of said face among said plurality of input images, and wherein said measured symmetry of said at least one selected image of said face is highest amongst said input images.

15. The apparatus of claim 14, wherein said plurality of input images are at least a part of a video sequence.

16. Apparatus for face recognition, the apparatus comprising: a face symmetry verifier, configured to verify symmetry of a face in at least one first image of said face, according to a predefined criterion of symmetry in a direction fixed with respect to variation in position of eyes in the image, wherein said first image is associated with respective data identifying said face; and a face database updater, associated with said face symmetry verifier, and configured to update a face database with said first image of said face and said associated data identifying said face, provided said symmetry of said face in said first image is successfully verified.

17. The apparatus of claim 16, wherein said face symmetry verifier is further configured to verify symmetry of said face in at least one second image of said face, according to said predefined symmetry criterion; the apparatus further comprising a face identifier, associated with said face symmetry verifier and configured to identify said face in said second image, using said face database, provided said symmetry of said face in said second image is successfully verified.

18. Apparatus for face recognition, the apparatus comprising: a face symmetry verifier, configured to verify symmetry of a face in at least one image, according to a predefined criterion of symmetry in a direction fixed with respect to variation in position of eyes in the image; and a forwarding controller, associated with said face symmetry verifier, and configured to control forwarding of said image, according to a result of said verification of said symmetry by said face symmetry verifier.

19. The apparatus of claim 1, wherein the predefined symmetry criterion is based on a geometric property of a polygon formable by connecting known face elements as appearing in the image.

20. The apparatus of claim 16, wherein the predefined symmetry criterion is based on a geometric property of a polygon formable by connecting known face elements as appearing in the image.

21. The apparatus of claim 18, wherein the predefined symmetry criterion is based on a geometric property of a polygon formable by connecting known face elements as appearing in the image.

22. Method for face recognition, the method comprising: a) verifying symmetry of a face in at least one image, according to a predefined symmetry criterion based on symmetry of the image with respect to a symmetry line independent of orientation of the face in the image; and b) identifying said face, provided said symmetry of said face is successfully verified.

23. The method of claim 22, wherein the symmetry line is parallel to a side of the image as captured.

24. The method of claim 22, wherein the symmetry line is vertical with respect to the image as captured.

\* \* \* \* \*